United States Patent
Liu et al.

(10) Patent No.: US 12,521,306 B2
(45) Date of Patent: *Jan. 13, 2026

(54) SYSTEM, APPARATUS, AND METHOD FOR SYNCHRONOUSLY CONTROLLING DEVICES

(71) Applicant: HYTTO PTE. LTD, Singapore (SG)

(72) Inventors: Dan Liu, Guangdong (CN); Jilin Qiu, Guangdong (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/965,663

(22) Filed: Dec. 2, 2024

(65) Prior Publication Data

US 2025/0090414 A1     Mar. 20, 2025

Related U.S. Application Data

(63) Continuation-in-part of application No. 18/371,785, filed on Sep. 22, 2023, and a continuation-in-part of application No. 17/934,290, filed on Sep. 22, 2022, said application No. 18/371,785 is a continuation-in-part of application No. 17/835,632, filed on Jun. 8, 2022, now Pat. No. 11,793,712, said
(Continued)

(51) Int. Cl.
*A61H 19/00* (2006.01)
*A61F 5/41* (2006.01)
*A61H 23/02* (2006.01)

(52) U.S. Cl.
CPC ............... *A61H 19/44* (2013.01); *A61F 5/41* (2013.01); *A61H 19/34* (2013.01); *A61F 2005/417* (2013.01); *A61H 23/02* (2013.01); *A61H 2201/5007* (2013.01); *A61H 2201/5071* (2013.01); *A61H 2201/5097* (2013.01)

(58) Field of Classification Search
CPC ........ A61H 19/34; A61H 19/40; A61H 19/44; A61H 2201/5007; A61H 2201/5097; A61F 5/41; A61F 2005/417
See application file for complete search history.

(56) References Cited

U.S. PATENT DOCUMENTS 6,368,368 B1 * 4/2002 Reeves ................... C08L 53/00
                                                                44/302
6,786,863 B2 * 9/2004 Abbasi .................... G06F 3/016
                                                                709/200
(Continued)

*Primary Examiner* — Timothy A Stanis
(74) *Attorney, Agent, or Firm* — Holtz, Holtz & Volek PC

(57) ABSTRACT

A system is disclosed. The system has an accessory control module, comprising computer-executable code stored in non-volatile memory, a processor, a user device of a human viewer, a viewer accessory configured to communicate with the user device, the viewer accessory including a first motor or a first heater, a model device of a human model, and a model accessory configured to communicate with the model device, the model accessory including a second motor or a second heater. The accessory control module, the processor, the user device, the viewer accessory, the model device, and the model accessory are configured to provide a chat communication application between the human viewer and the human model configured to provide chat between the human viewer via the user device and the human model via the model device.

20 Claims, 6 Drawing Sheets

Related U.S. Application Data application No. 17/934,290 is a continuation-in-part of application No. 17/717,917, filed on Apr. 11, 2022, now Pat. No. 11,938,078, said application No. 17/835,632 is a continuation-in-part of application No. 17/717,917, filed on Apr. 11, 2022, now Pat. No. 11,938,078, and a continuation-in-part of application No. 17/579,839, filed on Jan. 20, 2022, now Pat. No. 12,171,708, application No. 18/965,663 is a continuation-in-part of application No. 17/579,839, filed on Jan. 20, 2022, now Pat. No. 12,171,708, said application No. 17/934,290 is a continuation-in-part of application No. 17/579,839, filed on Jan. 20, 2022, now Pat. No. 12,171,708, said application No. 17/835,632 is a continuation-in-part of application No. 16/835,808, filed on Mar. 31, 2020, now Pat. No. 11,452,669, said application No. 17/934,290 is a continuation-in-part of application No. 16/835,808, filed on Mar. 31, 2020, now Pat. No. 11,452,669, said application No. 17/717,917 is a continuation of application No. 16/352,876, filed on Mar. 14, 2019, now Pat. No. 11,311,453, said application No. 17/579,839 is a continuation-in-part of application No. 16/352,876, filed on Mar. 14, 2019, now Pat. No. 11,311,453, and a continuation-in-part of application No. 16/290,085, filed on Mar. 1, 2019, now Pat. No. 11,896,911.

(60) Provisional application No. 62/830,195, filed on Apr. 5, 2019.

(56) References Cited

U.S. PATENT DOCUMENTS

| Patent/Pub. No. | | Date | Inventor | Class |
|---|---|---|---|---|
| 8,255,299 | B2* | 8/2012 | Cambridge | A61H 19/32 600/38 |
| 9,762,515 | B1* | 9/2017 | Olivares | G06Q 20/18 |
| 10,051,328 | B2* | 8/2018 | Olivares, II | H04W 4/80 |
| 10,576,013 | B1* | 3/2020 | Sloan | G06T 7/251 |
| 11,134,041 | B1* | 9/2021 | He | G06Q 20/065 |
| 2002/0133103 | A1* | 9/2002 | Williams | A61H 19/50 601/46 |
| 2003/0036678 | A1* | 2/2003 | Abbassi | A61H 19/40 340/407.1 |
| 2004/0082831 | A1* | 4/2004 | Kobashikawa | A61H 19/32 600/38 |
| 2015/0174000 | A1* | 6/2015 | Barasch | A61H 19/30 600/38 |
| 2015/0320636 | A1* | 11/2015 | Fine | A61H 19/44 600/38 |
| 2015/0328082 | A1* | 11/2015 | Jiang | A61H 23/02 600/38 |
| 2016/0199249 | A1* | 7/2016 | Dunham | A61H 21/00 601/15 |
| 2018/0168919 | A1* | 6/2018 | Fung | A61H 23/02 |
| 2019/0175441 | A1* | 6/2019 | Urbani | A61H 19/32 |
| 2020/0276504 | A1* | 9/2020 | Liu | A63F 13/35 |
| 2020/0289363 | A1* | 9/2020 | Liu | A61H 1/00 |
| 2020/0315909 | A1* | 10/2020 | Cambridge | A61H 1/00 |
| 2020/0366972 | A1* | 11/2020 | Sloan | H04N 21/4751 |
| 2021/0298989 | A1* | 9/2021 | Pounders | A61H 23/00 |
| 2022/0378648 | A1* | 12/2022 | Qiu | A61H 19/50 |
| 2024/0091097 | A1* | 3/2024 | Liu | A61H 23/00 |

\* cited by examiner

SYSTEM, APPARATUS, AND METHOD FOR SYNCHRONOUSLY CONTROLLING DEVICES

CROSS REFERENCE TO RELATED APPLICATIONS

This application is a Continuation-in-Part of U.S. patent application Ser. No. 17/579,839, filed Jan. 20, 2022, which is a Continuation-in-Part of U.S. application Ser. No. 16/352,876, filed Mar. 14, 2019, now U.S. Pat. No. 11,311,453, issued Apr. 26, 2022. U.S. patent application Ser. No. 17/579,839 is also a Continuation-in-Part of U.S. application Ser. No. 16/290,085, filed Mar. 1, 2019, now U.S. Pat. No. 11,896,911, issued Feb. 13, 2024.

This application is also a Continuation-in-Part of U.S. patent application Ser. No. 18/371,785, filed Sep. 22, 2023, which is a Continuation-in-Part application of U.S. application Ser. No. 17/835,632, filed Jun. 8, 2022, now U.S. Pat. No. 11,793,712, issued Oct. 24, 2023. U.S. application Ser. No. 17/835,632 is a Continuation-in-Part of U.S. patent application Ser. No. 17/579,839, filed Jan. 20, 2022. U.S. application Ser. No. 17/835,632 is also a Continuation-in-Part of U.S. patent application Ser. No. 17/717,917, filed Apr. 11, 2022, now U.S. Pat. No. 11,938,078, issued Mar. 26, 2024, which is a Continuation of U.S. application Ser. No. 16/352,876, filed on Mar. 14, 2019, now U.S. Pat. No. 11,311,453, issued Apr. 26, 2022. U.S. application Ser. No. 17/835,632 is also a Continuation-in-Part of U.S. patent application Ser. No. 16/835,808, filed Mar. 31, 2020, now U.S. Pat. No. 11,452,669, issued Sep. 27, 2022, which claims the benefit of U.S. Provisional Application No. 62/830,195, filed Apr. 5, 2019.

This application is also a Continuation-in-Part of U.S. patent application Ser. No. 17/934,290, filed Sep. 22, 2022, which is a Continuation-in-Part of U.S. patent application Ser. No. 17/579,839, filed Jan. 20, 2022. U.S. patent application Ser. No. 17/934,290 is also a Continuation-in-Part of U.S. patent application Ser. No. 17/717,917, filed Apr. 11, 2022, now U.S. Pat. No. 11,938,078, issued Mar. 26, 2024, which is a Continuation of U.S. patent application Ser. No. 16/352,876, filed Mar. 14, 2019, now U.S. Pat. No. 11,311,453 issued Apr. 26, 2022. U.S. application Ser. No. 17/934,290 is also a Continuation-in-Part of U.S. patent application Ser. No. 16/835,808, filed Mar. 31, 2020, now U.S. Pat. No. 11,452,669, issued Sep. 27, 2022, which claims the benefit of U.S. Provisional Application No. 62/830,195, filed Apr. 5, 2019.

Each of the above applications is hereby incorporated by reference in its entirety.

FIELD OF THE INVENTION

The present disclosure generally relates to a system, apparatus, and method for controlling devices, and more particularly to a system, apparatus, and method for synchronously controlling devices.

BACKGROUND OF THE INVENTION

Conventional control of imaging devices for providing images of a model such as a human model to a viewer, including devices operated by the human model, typically involve direct control of these devices by the model. Also, these devices are typically controlled independently of devices associated with a user viewing the model. Accordingly, conventional systems typically involve independent control of devices associated with a model and devices associated with users who are viewing the model.

Accordingly, a need in the art exists for an efficient technique for controlling devices associated with a model and devices associated with users who are viewing the model in a coordinated manner.

The exemplary disclosed system and method are directed to overcoming one or more of the shortcomings set forth above and/or other deficiencies in existing technology.

SUMMARY OF THE INVENTION

In one exemplary aspect, the present disclosure is directed to a system. The system includes an accessory control module, comprising computer-executable code stored in non-volatile memory, a processor, a user device of a human viewer, a viewer accessory configured to communicate with the user device, the viewer accessory including a first motor or a first heater, a model device of a human model, and a model accessory configured to communicate with the model device, the model accessory including a second motor or a second heater. The accessory control module, the processor, the user device, the viewer accessory, the model device, and the model accessory are configured to provide a chat communication application between the human viewer and the human model configured to provide chat between the human viewer via the user device and the human model via the model device, control the viewer accessory including controlling the first motor or the first heater to drive a predefined act of the viewer accessory, and control the model accessory including controlling the second motor or the second heater to drive the predefined act of the model accessory. The predefined act is driven synchronously in real-time to sexually stimulate synchronously both the human viewer and the human model using the viewer accessory and the model accessory during chat between the human viewer and the human model.

In another aspect, the present disclosure is directed to a system. The system includes an accessory control module, comprising computer-executable code stored in non-volatile memory, a processor, one or more user devices of one or more human viewers, one or more viewer accessories configured to communicate with the one or more user devices, the one or more viewer accessories each including a first motor or a first heater, a model device of a human model, and a model accessory configured to communicate with the model device, the model accessory including a second motor or a second heater. The accessory control module, the processor, the one or more user devices, the one or more viewer accessories, the model device, and the model accessory are configured to provide a chat communication application between the one or more human viewers and the human model configured to provide chat between the one or more human viewers via the one or more user devices and the human model via the model device, control the one or more viewer accessories including controlling each of the first motor or the first heater to drive a predefined act of the one or more viewer accessories, and control the model accessory including controlling the second motor or the second heater to drive the predefined act of the model accessory. The predefined act is driven synchronously in real-time to sexually stimulate synchronously the one or more human viewers and the human model using the one or more viewer accessories and the model accessory when the human model chats with the one or more human viewers.

DETAILED DESCRIPTION AND INDUSTRIAL APPLICABILITY

Figure 1:
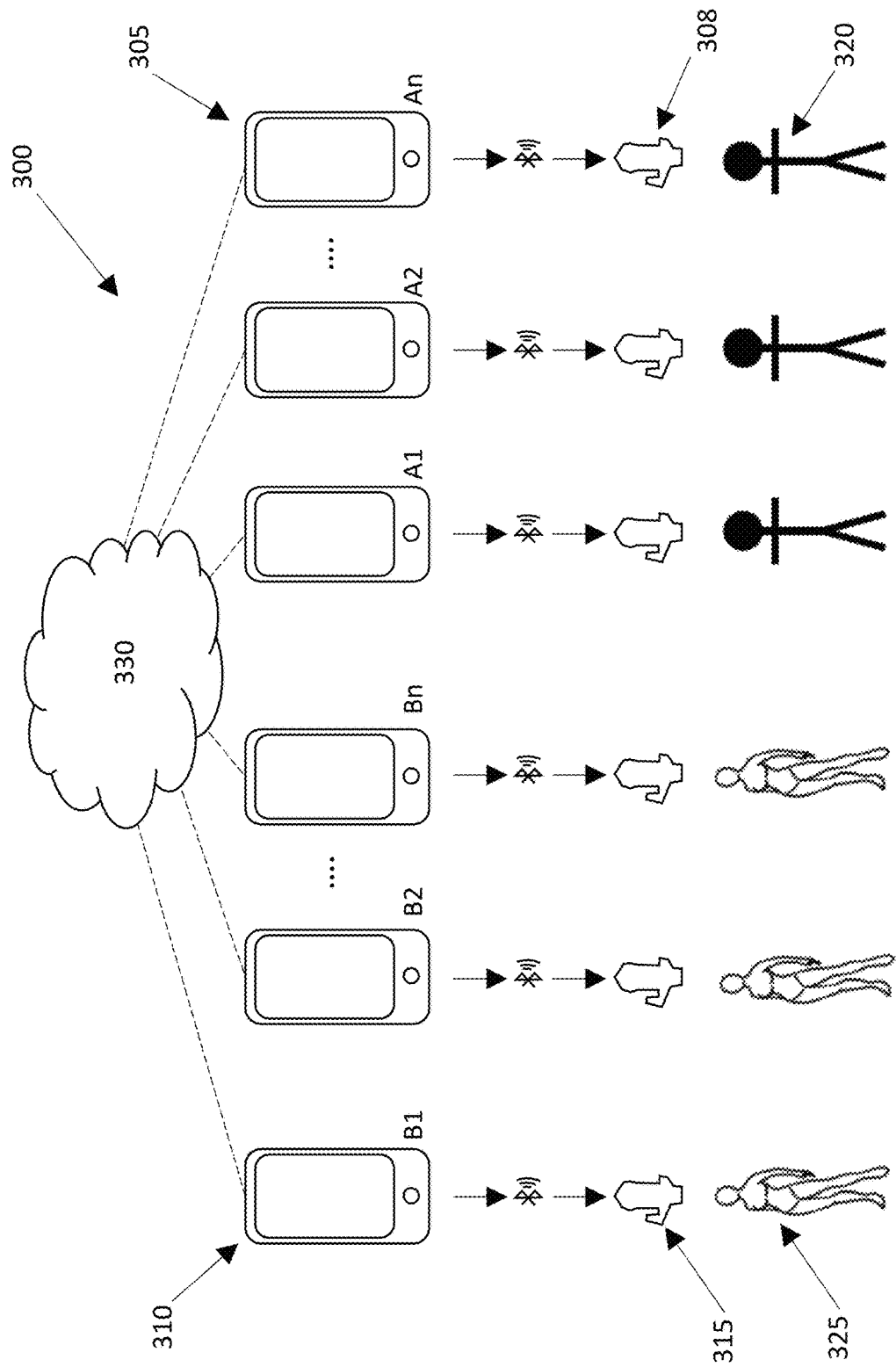
FIG. 1 is a schematic illustration of an exemplary system of the present invention.

FIG. 1 illustrates an exemplary system 300 for synchronously controlling devices. In at least some exemplary embodiments, system 300 may be a system for synchronously controlling devices in real-time (e.g., in real-time or in near real-time) for an adult entertainment application.

As illustrated in FIG. 1, system 300 may include one or more user devices 305, one or more model devices 310, one or more viewer accessories 308, and one or more model accessories 315. For example, system 300 may include a plurality of user devices 305, a plurality of viewer accessories 308, a plurality of model devices 310, and a plurality of model accessories 315. Data such as image data, audio data, and/or control data may be transferred between user devices 305, viewer accessories 308, model devices 310, and model accessories 315.

As illustrated in FIG. 1, system 300 may include any desired number of user devices 305 (e.g., A1, A2, . . . . An). User device 305 may be any suitable device for interfacing with other components of system 300 such as a computing device (e.g., user interface). For example, user device 305 may be any suitable user interface for receiving input and/or providing output (e.g., image data) to a user 320. User device 305 may include a camera and a microphone. User device 305 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 300, and/or any other suitable user interface (e.g., including components and/or configured to work with components described below regarding FIGS. 5 and 6). For example, user device 305 may include a touchscreen device of a smartphone or handheld tablet. For example, user device 305 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application for example as described herein and/or a web browser may be installed on user device 305 and utilized by user 320.

Figure 2:
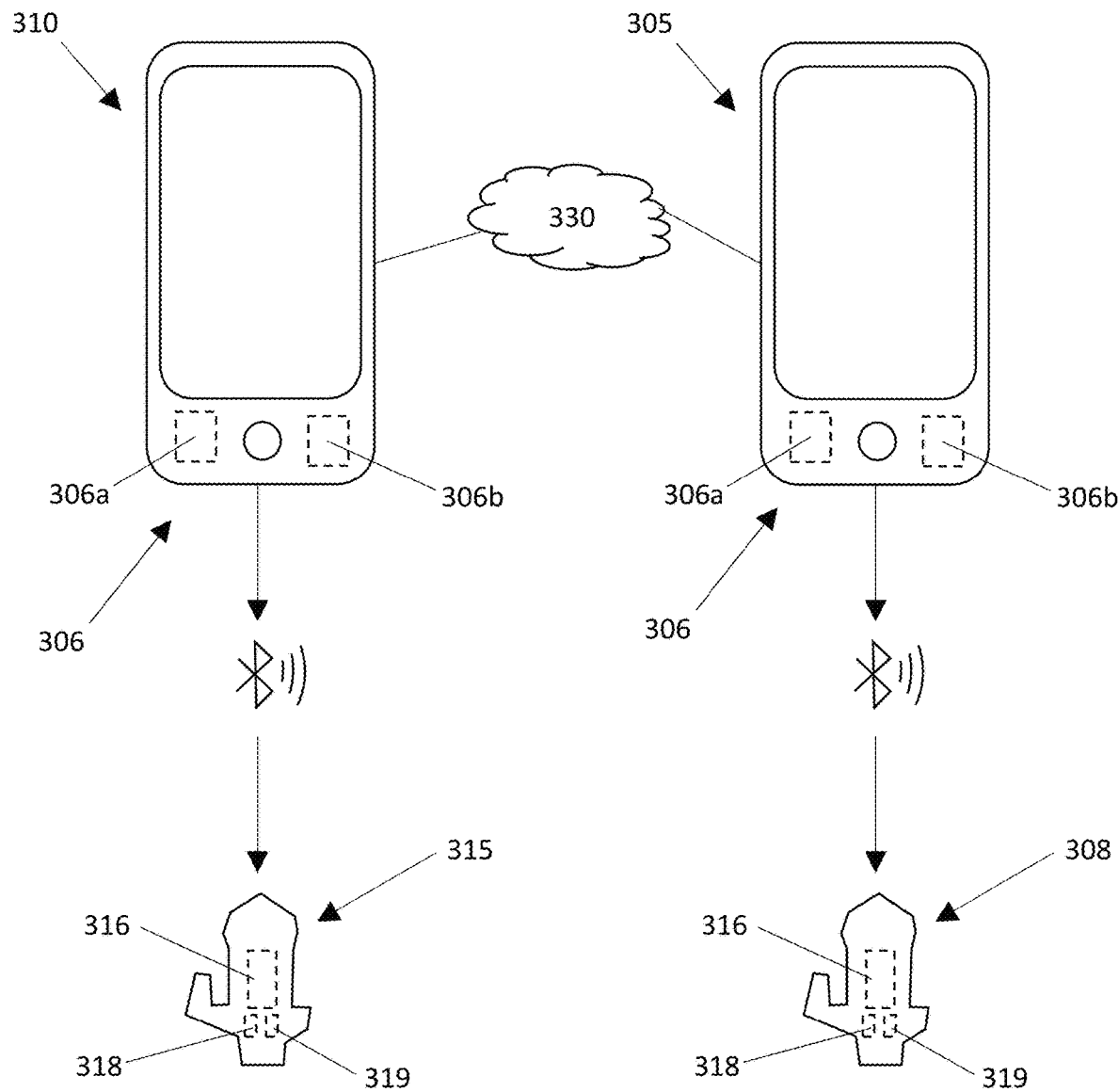
FIG. 2 is a schematic illustration of an exemplary system of the present invention.

As illustrated in FIG. 2, user device 305 may include a sensor array 306. In at least some exemplary embodiments, sensor array 306 may include one or more sensors integrated or built into the exemplary disclosed user device (e.g., user device 305) such as, for example, a mobile phone, a pad, or a wearable device. Sensor array 306 may include any suitable sensors for use with system 300 such as, for example, a location sensor 306a and a movement sensor 306b. Location sensor 306a may include a GPS device, a Galileo device, a GLONASS device, an IRNSS device, a BeiDou device, and/or any other suitable device that may operate with a global navigation system.

Movement sensor 306b may include any suitable components for sensing motion (e.g., motion amplitude), velocity, and/or acceleration. Movement sensor 306b may include an acceleration sensor. Movement sensor 306b may include a gyroscope. For example, movement sensor 306b may include a displacement sensor, a velocity sensor, and/or an accelerometer. For example, movement sensor 306b may include components such as a servo accelerometer, a piezoelectric accelerometer, a potentiometric accelerometer, and/or a strain gauge accelerometer. Movement sensor 306b may include a piezoelectric velocity sensor or any other suitable type of velocity or acceleration sensor.

System 300 may include any desired number of model devices 310 (e.g., B1, B2, . . . . Bn). Model device 310 may be similar to user device 305. For example, model device 310 may be any suitable user interface for receiving input and/or providing output (e.g., image data) to a model 325. Model 325 (e.g., a specific user) may operate model device 310 (e.g., a specific user device) to record and transfer image (e.g., video) and audio data to one or more users 320 via a network 330.

Model accessory 315 may be any suitable accessory for use by model 325 (e.g., when model 325 is imaged by model device 310). For example, model accessory 315 may be a prop that is used by model 325 while model 325 is being imaged (e.g., a video or pictures of model 325 are being recorded and/or transmitted in real-time to be viewed by user 320). For example, model accessory 315 may be a device used for erotic stimulation (e.g., a sex aid or a "sex toy"). Model accessory 315 may be a sexual simulation device that may be associated with a given model 325 (e.g., a specific user) and respective model device 310 (e.g., a specific user device) of that given model 325. In at least some exemplary embodiments, model accessory 315 may be a massaging apparatus for human genitalia (e.g., a vibrator). For example, model accessory 315 may be any suitable device for use in a video or pictures recorded by model device 310, which may be an erotic video or erotic pictures). In at least some exemplary embodiments, model accessory 315 may be a tool or other indicator that may be used in video or pictures recorded by model device 310 such as surveying equipment, a sign providing information such as location or time information, a surveillance tool used by model 325, and/or any other suitable tool or accessory that may be used while model device 310 is recording a video or pictures of model 325. For example, model 325 may be an erotic model using model accessory 315 that may be an erotic device, a technician or laborer using model accessory 315 that may be a tool or work device specific to a desired application, an operative using model accessory 315 that may be a surveillance tool or a part of a weapon system being recorded by model device 310, and/or any other desired role using any suitable model accessory 315.

Model accessory 315 may include a motor 316. Motor 316 may include an electric motor. Motor 316 may include a server motor, a stepper motor, a brushless motor, or any other suitable type of motor. Motor 316 may include any suitable vibration motor or haptic motor such as, for example, a mini vibrator motor. Motor 316 may include a low voltage motor. Motor 316 may include a pager motor or a coin vibration motor. Motor 316 may include a linear resonant actuator or an eccentric rotating mass vibration motor. Motor 316 may be powered by any suitable power source, such as a battery (e.g., a nickel-metal hydride battery, a lithium-ion battery, an ultracapacitor battery, a lead-acid battery, and/or a nickel cadmium battery), an electric power source (e.g., a transformer connected to a plug that may plug into an outlet), and/or any other suitable energy source. Model accessory 315 may include a controller 319 that may be any suitable computing device for controlling an operation of motor 316 and a communication device 318. Controller 319 may, for example, include components similar to the components described below regarding FIG. 5. Controller 319 may include for example a processor (e.g., micro-processing logic control device) or board components. Controller 319 may control motor 316 based on input data and/or commands received from user device 305 and/or model device 310 via network 330 and/or a communication device 318 (e.g., transferred directly to communication device 318 by any suitable component of system 300). Motor 316 may be controlled by controller 319 to vibrate model accessory 315 at a desired level or strength, perform a suction operation at a desired level or strength using model accessory 315 (e.g., using model accessory 315 as a suction device), rotate or swing model accessory 315 at a desired speed or amount, contract or expand model accessory 315 by a desired amount, cause model accessory 315 to perform an inhalation action, and/or cause model accessory 315 to perform any other suitable action or function.

In at least some exemplary embodiments, motor 316 may be or may include a thermal device such as a heater. In at least some exemplary embodiments, motor 316 may include an electric heating device such as an electric resistance heating device. Motor 316 may include a polyimide heater, a silicone rubber heater, and/or a resistive wire heater. Motor 316 may be controlled by controller 319 to heat or emit heat or warmth from model accessory 315. For example, motor 316 may cause a temperature variation of model accessory 315.

Viewer accessory 308 may be similar to model accessory 315. Viewer accessory 308 may be a sexual simulation device that may be associated with a given user 320 (e.g., a viewer of one or more models 325) and respective user device 305 (e.g., a viewer device) of that given user 320.

Network 330 may be any suitable communication network over which data may be transferred between one or more user devices 305, one or more viewer accessories 308, one or more model devices 310, and/or one or more model accessories 315. Network 330 may be the internet, a LAN (e.g., via Ethernet LAN), a WAN, a WiFi network, or any other suitable network. Network 330 may be similar to WAN 201 described below. The components of system 300 may also be directly connected (e.g., by wire, cable, USB connection, and/or any other suitable electro-mechanical connection) to each other and/or connected via network 330. For example, components of system 300 may wirelessly transmit data by any suitable technique such as, e.g., wirelessly transmitting data via 4G LTE networks (e.g., or 5G networks) or any other suitable data transmission technique for example via network communication. Components of system 300 may transfer data via the exemplary techniques described below regarding FIG. 6. User devices 305, viewer accessories 308, model devices 310, and/or model accessories 315 may include any suitable communication components for communicating with other components of system 300 using for example the communication techniques described above. For example, user devices 305 and model devices 310 may include integrally formed communication devices (e.g., smartphone components), and viewer accessories 308 and model accessories 315 may each include communication device 318 that may communicate using any of the exemplary disclosed communication techniques.

In at least some exemplary embodiments, a given model accessory 315 may communicate with a given model device 310 (e.g., a paired model device 310) via any suitable short distance communication technique. For example, model accessories 315 (e.g., via communication device 318) and model devices 310 may communicate via Wifi, Bluetooth, ZigBee, NFC, IrDA, and/or any other suitable short distance technique. Model accessory 315 may be an adult toy that may be connected with model device 310 through short distance wireless communication. An application (e.g., operating using the exemplary disclosed modules) may be installed on model device 310, the application and model device 310 being configured to send commands to model accessory 315 to drive (e.g., actuate) model accessory 315. Viewer accessory 308 may communicate with user device 305 similarly to the communication of model accessory 315 and model device 310 described above.

System 300 may include one or modules for performing the exemplary disclosed operations. The one or more modules may include an accessory control module for controlling viewer accessory 308 and model accessory 315. The one or more modules may be stored and operated by any suitable components of system 300 (e.g., including processor components) such as, for example, network 330, user device 305, viewer accessory 308, model device 310, model accessory 315, and/or any other suitable component of system 300. For example, system 300 may include one or more modules having computer-executable code stored in non-volatile memory. System 300 may also include one or more storages (e.g., buffer storages) that may include components similar to the exemplary disclosed computing device and network components described below regarding FIGS. 5 and 6. For example, the exemplary disclosed buffer storage may include components similar to the exemplary storage medium and RAM described below regarding FIG. 5. The exemplary disclosed buffer storage may be implemented in software and/or a fixed memory location in hardware of system 300. The exemplary disclosed buffer storage (e.g., a data buffer) may store data temporarily during an operation of system 300.

The one or more exemplary disclosed modules may also provide a chat room interface via user device 305 and model device 310 for use by each user 320 and model 325. For example, video display of model 325, one or more users 320, and/or and a chat or messaging app (e.g., any suitable chat communication or messaging app such as, for example, text, voice, and/or video chat boxes) may be displayed to each user 320 via user device 305 and to each model 325 via model device 310. One or more users 320 and one or more models 325 may thereby view and chat (e.g., text, voice, and/or video chat) with each other via the one or more exemplary disclosed modules via respective user devices 305 and model devices 310. Each user 320 may thereby view, interact with, and/or chat (e.g., text, voice, and/or video chat) with one or more models 325 and/or other users 320. Also, each model 325 may thereby view, interact with, and/or chat with one or users 320 and/or other models 325. For example, multiple text, voice, and/or video chat boxes including a plurality of users 320 (e.g., viewers each having one or more viewer accessories 308) and/or a plurality of models 325 (e.g., each having one or more model accessories 315) may be displayed to each user 320 and each model 325 via respective user devices 305 and model devices 310.

Figure 3:
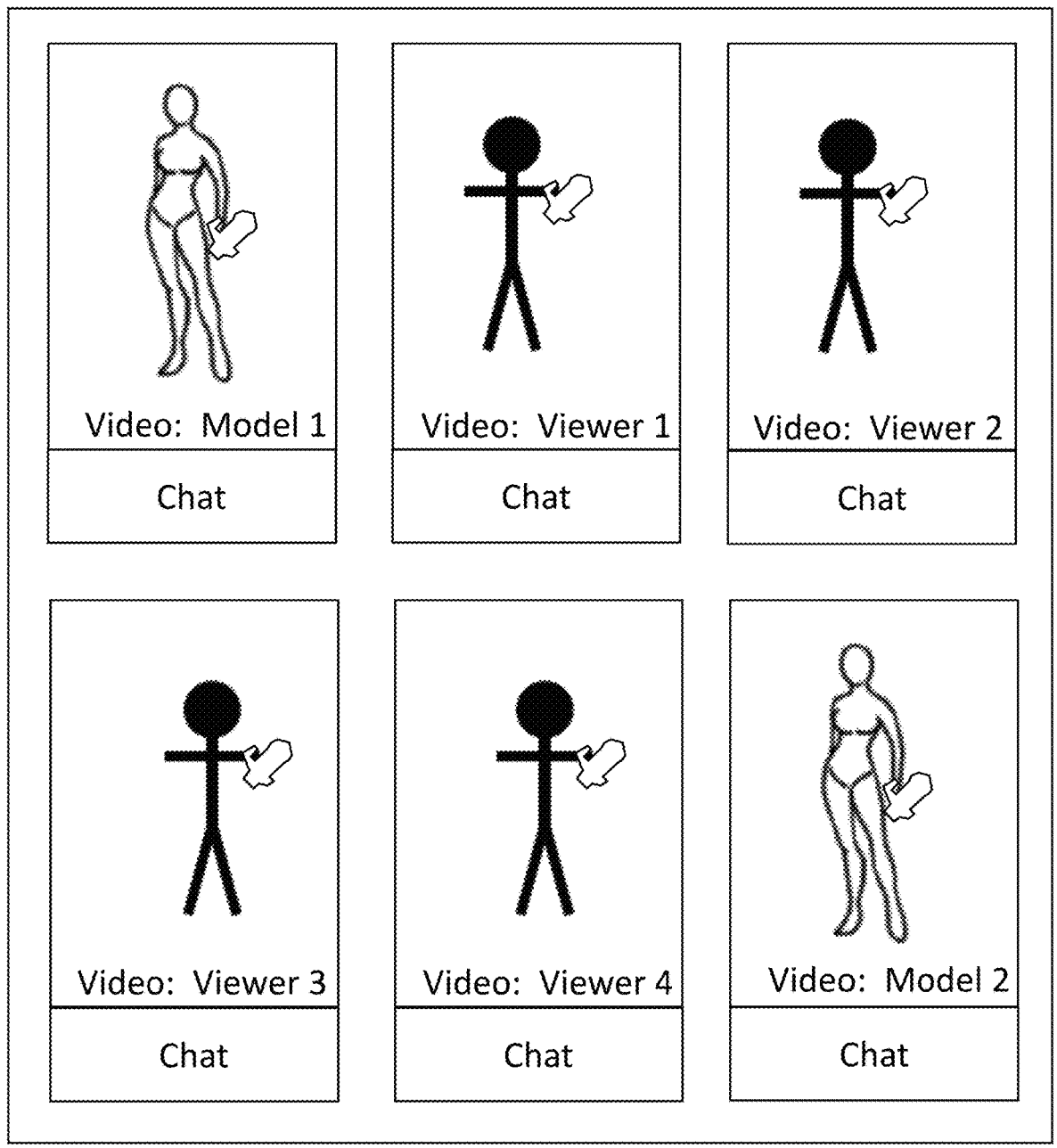
FIG. 3 is a schematic illustration of an exemplary system of the present invention.

Users 320 and models 325 may thereby view and interact with other users 320 and models 325 that may each have one or more respective accessories (e.g., respective viewer accessories 308 and model accessories 315). FIG. 3 schematically illustrates an exemplary embodiment of the exemplary disclosed chat room that may be displayed to user 320 via user device 305 or to model 325 via model device 310.

The exemplary disclosed system, apparatus, and method may be used in any suitable telecommunications application. The exemplary disclosed system, apparatus, and method may be used in any suitable application for providing images of a model such as a human model to a user such as a remotely-located user. The exemplary disclosed system, apparatus, and method may be used in any suitable application for providing entertainment based on viewing images or videos. For example, the exemplary disclosed system, apparatus, and method may be used in any suitable application for controlling an imaging device such as a user device and a device operated by a human model being imaged by the imaging device. The exemplary disclosed system, apparatus, and method may be used in any suitable telecommunication application for adult entertainment.

Figure 4:
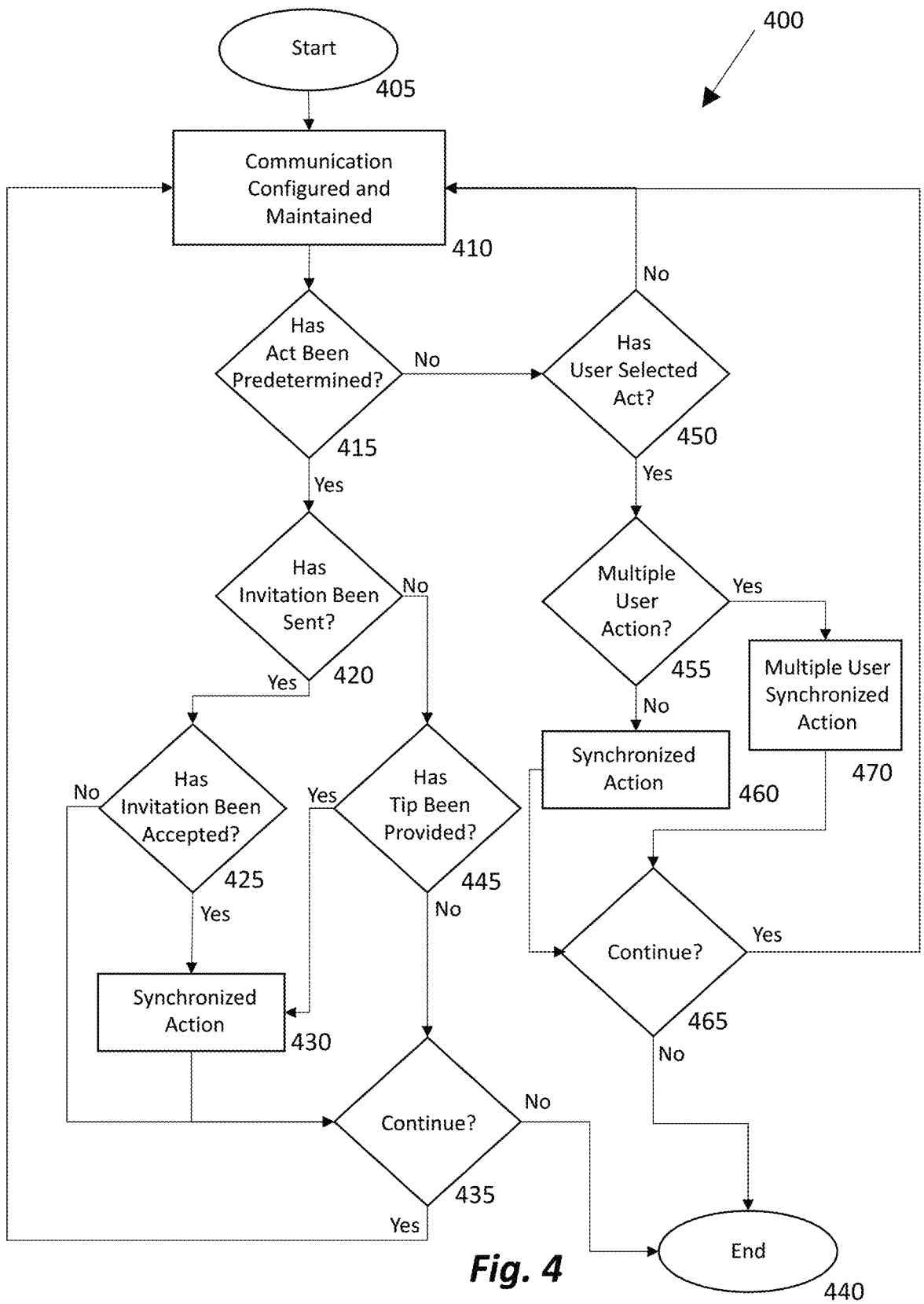
FIG. 4 is a flowchart showing an exemplary process of the present invention.

An exemplary operation of the exemplary disclosed system, apparatus, and method will now be described. FIG. 4 illustrates an exemplary process 400 of system 300. Process 400 begins at step 405.

At step 410, system 300 may be configured, re-configured, and/or communication provided by system 300 may be maintained. For example, system 300 may be configured as illustrated in FIGS. 1 and 2 or with any other suitable configuration. System 300 may provide a communication interface such as a chat room or interactive application to one or more users 320 and/or one or more models 325 such as, for example, as illustrated in FIG. 3. One or more users 320 and one or more models 325 may thereby communicate and interact with each other using live video communication in real-time or near real-time. Any desired number and arrangement of user devices 305, viewer accessories 308, model devices 310, and model accessories 315 may be included in the configuration of system 300. One or more viewer accessories 308 and one or more model accessories 315 (e.g., sexual stimulation devices such as operable adult toys) may be configured to receive data and signals from other components of system 300 for example as described herein. The exemplary disclosed module, storage (e.g., storage buffer), and hardware may include a memory having stored thereon instructions, a processor configured to execute the instructions resulting in a software application, and a software application configured to perform process 400.

In at least some exemplary embodiments at step 410, user 320 may install an application of system 300 on user device 305 (e.g., and/or model 325 may install the application on model device 310). User 320 (e.g., and/or model 325) may authorize the application to access and control functions of user device 305, viewer accessory 308, model device 310, and/or model accessory 315. User 320 (e.g., and/or model 325) may also authorize the application to access the data of Bluetooth or any other suitable communication components of user device 305 (e.g., and/or model device 310). Model 325 (e.g., and/or user 320) may also connect model accessory 315 (e.g., and/or viewer accessory 308) to model device 310 (e.g., and/or user device 305) via Bluetooth or any other suitable communication technique. In at least some exemplary embodiments, viewer accessory 308 and/or model accessory 315 may be connected by the exemplary disclosed short range communication techniques to user device 305 and/or model device 310 and operated by user 320 and/or model 325 (e.g., user 320 and/or model 325 may control any of the exemplary disclosed devices directly or via network 330).

At step 415, the exemplary disclosed system may determine whether or not a predefined act has been predetermined. The predefined act may include any desired operation of viewer accessory 308 and/or model accessory 315. A synchronization action start instruction may be provided (e.g., to model 325), the synchronization action start instruction including instructions to perform one or more predefined acts. For example, a predefined act of viewer accessory 308 and/or model accessory 315 may include vibration, a suction operation, rotation, swinging, contracting, expanding, performing an inhalation action, heating, cooling, undergoing temperature variation, and/or any other suitable action or function for example as described herein. The predefined act may be based on user input (e.g., of one or more users 320 and/or one or more models 325), an algorithm of the exemplary disclosed module, a machine learning operation of the exemplary disclosed system, and/or any other suitable criteria for determining a predefined act. If a predefined act has been predetermined, process 400 may proceed to step 420 as described below. If a predefined act has not been predetermined, process 400 may proceed to step 450 as described below.

At step 420, the exemplary disclosed system may determine whether or not an invitation has been sent by one of the plurality of models 325 and users 320 to other of the plurality of models 325 and users 320. For example, the exemplary disclosed system may determine that model 325 sent an invitation to one or more users 320 (e.g., viewers). The invitation may be provided via the exemplary disclosed interactive or messaging application (e.g., chat room) for example as illustrated in FIG. 3. The invitation may be provided via private message (e.g., private text message), a prompt to one or more users 320 based on input provided to the exemplary disclosed module via model 325, video interaction, and/or any other suitable data transfer using the exemplary disclosed components and modules of system 300. The exemplary disclosed invitation may be for a synchronous predefined act. The synchronous predefined act of viewer accessories 308 and model accessories 315 may include vibration, a suction operation, rotation, swinging, contracting, expanding, performing an inhalation action, heating, cooling, undergoing temperature variation, and/or any other suitable action or function for example as described herein. The recipients of the invitation may be selected by any suitable technique such as, for example, random selection of users 320 and/or models 325 by the exemplary disclosed system, manual or intentional selection (e.g., input data) by a given model 325 (e.g., or given user 320), voting (e.g., via input data) by the plurality of users 320 and/or models 325, a predetermined algorithm of the exemplary disclosed modules, exemplary disclosed machine learning operations, and/or any other suitable criteria. If an invitation for a synchronous predefined act has been sent to one or more recipients (e.g., one or more users 320 and/or models 325), process 400 may proceed to step 425 as described below. If an invitation for a synchronous predefined act has not been sent, process 400 may proceed to step 445 as described below.

At step 425, the exemplary disclosed system may determine whether or not the invitation has been accepted by the one or more recipients described above at step 420. For example, each recipient (e.g., user 320 or model 325) may accept or decline the invitation via input (e.g., interaction)

via the exemplary disclosed interactive application for example as illustrated in FIG. 3. For example, system 300 may determine one or more users 320 and/or models 325 who have accepted an invitation based on processing transferred data (e.g., input data, video or image data including facial and/or audio recognition of a physical or audio response of users 320 or models 325, machine learning operations based on processed data of system 300, and/or any other suitable technique). For example, the exemplary disclosed system may use machine learning operations to identify positive reaction or acceptance to invitations based on a processed video data stream of users 320 and/or models 325 (e.g., including machine learning of human movements, behavior, and body language). If an invitation for a synchronous predefined act has been accepted by at least one or more recipients (e.g., one or more users 320 and/or models 325), process 400 may proceed to step 430 as described below. If an invitation for a synchronous predefined act has not been accepted by at least one recipient, process 400 may proceed to step 435 as described below.

At step 430, the exemplary disclosed system may synchronize the exemplary disclosed predetermined act in real-time or near real-time. Accessories (e.g., one or more viewer accessories 308 and one or more model accessories 315) of some or all users 320 and some or all models 325 (e.g., users 320 and models 325 that accepted an invitation at step 425) may synchronously perform the exemplary disclosed predefined act in real-time or near real-time. For example, respective viewer accessories 308 of each user 320 who accepted the invitation at step 425 and respective model accessories 315 of each model 325 who accepted the invitation at step 425 may operate synchronously and perform a given (e.g., the same) predefined act at the same time. For example, one or more viewer accessories 308 and one or more model accessories 315 may synchronously perform the same vibration operation, suction operation, rotation, swinging, contracting, expanding, inhalation action, heating, cooling, temperature variation, and/or any other suitable action or function for example as described herein in real-time or near real-time. Multiple types of exemplary disclosed predefined acts may be synchronously performed. One or more users 320 and one or more models 325 may observe and interact with each other in real-time or near real-time via the exemplary disclosed applications (e.g., as illustrated in FIG. 3) during the synchronous operation of respective one or more viewer accessories 308 and one or more model accessories 315. For example, one or more users 320 and/or one or more models 325 may talk to each other, post comments to each other (e.g., post "likes" or "dislikes"), and/or interact with each other however desired via the exemplary disclosed application (e.g., as illustrated in FIG. 3). The exemplary disclosed predefined act may continue for any desired duration. In at least some exemplary embodiments, model 325 may control the duration of the predefined act by using the model's model device 310 and/or model accessory 315.

When synchronous performance of the exemplary disclosed predefined act has finished (e.g., based on the exemplary disclosed control described above by model 325, a predetermined period of time elapsing that may be for example associated with tips provided by one or more users 320, an operation of an algorithm of the exemplary disclosed module, and/or any other suitable criteria), process 400 may proceed to step 435. At step 435, system 300 may determine whether or not to continue an operation based on, for example, control by one or more models 325 (e.g., or users 320) via respective one or more model devices 310 and/or model accessories 315, control by system 300 for example based on the exemplary disclosed modules and/or machine learning operations, whether or not a predetermined period of time has elapsed, based on an amount of tips provided by one or more users 320, and/or any other suitable criteria. If operation is to be continued, process 400 returns to step 410, at which communication may be maintained and/or reconfigured (e.g., new users 320 and/or models 325 may enter a chat room of the exemplary disclosed communication application). The exemplary disclosed steps of process 400 may be repeated for as many iterations as desired. If operation is not to be continued, process 400 ends at step 440.

Referring back to step 420, if an invitation for a synchronous predefined act has not been sent, process 400 may proceed to step 445. At step 445, system 300 may determine whether or not a reward or tip has been provided for example by one or more users 320 (e.g., viewers of one or more models 325). In at least some exemplary embodiments, system 300 may be configured (e.g., the exemplary disclosed one or more modules may be configured) to define (e.g., set up or to have) one or more ranges of rewards or tips for example for models 325. Each of the one or more ranges of rewards or tips may correspond to a given predefined act. Rewards or tips may include virtual currency that may be purchased by (e.g., user 320) or credited to (e.g., model 325) users using any suitable payment technique. Rewards or tips may be awarded by user 320 to model 325 based on a performance of model 325 viewed by user 320 (e.g., adult entertainment). An application of system 300 operating based on the exemplary disclosed modules may be configured to receive reward messages or data from any suitable devices (e.g., user device 305, model device 310, and/or any other suitable external device). The reward messages or data may include a reward amount. System 300 may determine whether the reward (e.g., reward data) falls into one or more predetermined reward ranges (e.g., reward amount ranges) that may correspond to one or more exemplary disclosed predefined acts. In at least some exemplary embodiments, when model 325 receives tips from one or more users 320, model 325 may open a synchronization action start instruction of step 415. If a reward (e.g., a tip) falls within one or more predetermined reward amount ranges, model accessory 315 may be controlled to perform the exemplary disclosed predefined act. In at least some exemplary embodiments, each user 320 may provide tips via the user's user device 305, and each model 325 may receive tips via the model's model device 310.

If a tip has been provided, process 400 proceeds to step 430. Depending on the tip provided (e.g., tip amount provided), the predefined act determined at step 415 may be synchronously performed for example as described above. Also for example, a different or multiple predefined acts may be synchronously performed based on an amount of tips provided. In at least some exemplary embodiments, viewer accessories 308 associated with those users who provided tips at step 445 may operate synchronously with model accessories 415 at step 430. The exemplary disclosed synchronous operation for example as described above may occur during step 430 based on tips provided at step 445. If no tips are provided at step 445, process 400 may proceed to step 435 and the exemplary disclosed steps of process 400 may be repeated as desired.

Referring back to step 415, if a predefined act has not been predetermined, process 400 may proceed to step 450. At step 450, system 300 may determine whether or not one or more users 320 has selected a predefined act. For example, one or more users 320 may select a predefined act to be predetermined by providing tips similar to as described at step 445.

One or more users 320 may also use credits (e.g., loyalty credits or any other suitable credits earned based on using system 300) to select a predefined act to be predetermined. One or more models 325 may also select a predefined act to be predetermined. One or more users 320 (e.g., and/or models 325) may vote on a predefined act to be predetermined for example by using the exemplary disclosed communication application (e.g., as illustrated in FIG. 3). If one or more users 320 (e.g., and/or one or more models 325) selects a predefined act, system 400 may proceed to step 455. If a predefined act has not been selected, process 400 may return to step 410 (e.g., or process 440 may end at step 440).

At step 455, system 300 may determine whether or not a multiple user action is to be performed. If system 300 determines that a multiple user action is not to be performed (e.g., which may be similar to the determination made at steps 425 or 445), system 400 may proceed to step 460. A predefined synchronous act may be performed at step 460 similar to step 430. System 300 may then determine whether an operation is to be continued at step 465, which may be similar to step 435. If an operation is to be continued, process 400 may return to step 410, and the exemplary disclosed steps of process 400 may be repeated as desired. If an operation is not to be continued, process 400 ends at step 440.

Referring back to step 455, if system 300 determines at step 455 that a multiple user action is to be performed, process 400 may proceed to step 470. System 300 may determine at step 455 that a multiple user action is to be performed based on tips provided by multiple users 320 similar to for example as described above at step 445, voting (e.g., via input data) by the plurality of users 320 and/or models 325, user input, an operation of a predetermined algorithm and/or machine learning operations of system 300, and/or any other suitable criteria.

The multiple user action performed at step 470 may be generally similar to the synchronized action described at step 430 and may also include one or more multiple user actions. For example, model accessory 315 of a first model 325 and one or more viewer accessories 308 of respective one or more users 320 may synchronously perform a first exemplary disclosed predefined act in real-time or near real-time, and model accessory 315 of a second model 325 and one or more viewer accessories 308 of respective one or more users 320 (e.g., that may include some, all, and/or different users as above) may synchronously perform a second exemplary disclosed predefined act in real-time or near real-time. For example, multiple predefined acts may be synchronously performed by a same set or differing subsets of viewer accessories 308 and model accessories 315 operating using the exemplary disclosed communication application (e.g., as illustrated in FIG. 3) in real-time or near real-time. The one or more users 320 and/or one or more models 325 may vote or rank each other's performance (e.g., an entertainment value of the performance for the group), with a winner receiving more or less additional operation time (e.g., being allowed to continue to have their respective viewer accessories 308 and/or model accessories 315 continue to operate synchronously). In at least some exemplary embodiments, one or more models 325 may use respective one or more model accessories 315 to synchronously perform one or more different predefined acts with a same or varied groups of users 320. Some users 320 and/or models 325 may participate in the predefined acts and some may view (e.g., and/or rate, comment on, provide encouragement or discouragement on, and/or interact with other users 320 and/or models 325) the synchronous operation of one or more viewer accessories 308 and/or model accessories 315 in real-time or near real-time. One or more users 320 and/or models 325 may sell or auction of their participation in a given synchronous operation of one or more predefined acts to other users 320 and/or models 325 (e.g., for example via the exemplary disclosed interactive application for example as illustrated in FIG. 3). When the multiple user synchronized action has ended based on any suitable criteria such as for example as described above, process 400 may proceed to step 465. The exemplary disclosed steps of process 400 may be repeated for as many iterations as desired.

In at least some exemplary embodiments, the exemplary disclosed system may be an online interactive entertainment system. The exemplary disclosed system may include an operable sexual stimulation device (e.g., a viewer accessory 308 or a model accessory 315) configured to receive signals, a chat communication application configured to realize online chat (e.g., text, voice, and/or video chat) and communication interaction between users, a memory having stored thereon instructions, and a processor to execute said instructions resulting in a software application. The exemplary disclosed software application program may be configured to operate when a specific user such as model 325 chats with one or more viewers such as user 320 in a chat room of said chat communication application. One or more of the sexual stimulation devices associated with the viewer such as user 320 may perform the exemplary disclosed predefined act synchronously in real-time or near real-time with the sexual stimulation device associated with a specific user (e.g., model 325).

In at least some exemplary embodiments, the exemplary disclosed system may include one or more viewer user devices (e.g., user devices 305) connected to one or more said sexual stimulation devices (e.g., viewer accessories 308) associated with one or more viewer users (e.g., users 320) via Bluetooth or WiFi, and a specific user device (e.g., model device 315) connected to a sexual stimulation device (e.g., model accessory 315) associated with the specific user (model 325) via Bluetooth or WiFi. The specific user device and the viewer user device may also respectively have an application (e.g., exemplary disclosed communication application) installed thereon, said application being configured to send commands to the sexual stimulation device to actuate the sexual stimulation device to perform the predefined act. In at least some exemplary embodiments, the viewer user device and the specific user device may be mobile phones, wearable devices, tablets, or computers. The exemplary disclosed system may send (e.g., by the specific user such as model 325) an invitation for a synchronous predefined act to one or more of the viewer users (e.g., users 320) in the chat communication application. One or more of the viewer users may accept the invitation of the predefined act to actuate the one or more sexual stimulation devices associated with the viewer users and the sexual stimulation devices associated with the specific user to synchronize the predefined act in real-time or near real-time. The exemplary disclosed system may preset a synchronous action start instruction provided to the specific user (e.g., model 325). When the specific user opens the synchronization action start instruction in a chat room of the exemplary disclosed communication application (e.g., chat application), one or more of the viewer users (e.g., users 320) in the chat room may choose to follow the specific user, to actuate the one or more sexual stimulation devices (e.g., viewer accessories 308) associated with the viewer users and the sexual stimulation device (e.g., model accessory 315) associated with the specific user to synchronize the predefined act in real-time or near real-time. In the exemplary disclosed communication application (e.g., chat communication application), the specific user (e.g., model 325) may receive tips from one or more viewer users, to actuate the one or more sexual stimulation devices (e.g., viewer accessories 308) associated with the tip users (e.g., users 320) and the sexual stimulation device (e.g., model accessory 315) associated with the specific user (e.g., model 325) to synchronize the exemplary disclosed predefined act in real-time or near real-time. The tips may include virtual currency such as national currencies, cryptocurrency, and/or any other suitable currency.

In at least some exemplary embodiments, the exemplary disclosed system may include an operable sexual stimulation device (e.g., viewer accessory 308 or model accessory 315) configured to receive signals, one or more viewer user devices (e.g., user devices 305) connected to one or more sexual stimulation devices (e.g., viewer accessory 308) associated with the viewer user (e.g., user 320), a chat communication application, configured to realize online chat and communication interaction between users, a specific user device (e.g., model device 310) connected to the sexual stimulation device (e.g., model accessory 315) associated with the specific user (e.g., model 325), a memory having stored thereon instructions, and a processor to execute said instructions resulting in a software application. The exemplary disclosed software application program may be configured to operate when the specific user (e.g., through the associated specific user device such as model device 310) chats with one or more viewer users (e.g., users 320) through associated one or more viewer user devices (e.g., user devices 305) in a chat room of the exemplary disclosed communication application. One or more of the sexual stimulation devices (e.g., viewer accessories 308) associated with the viewer user devices (e.g., user devices 305) may perform a predefined act synchronously in real-time with the sexual stimulation device (e.g., model accessory 315) associated with the specific user device (e.g., model device 310).

In at least some exemplary embodiments, the exemplary disclosed method may be an online interactive entertainment method. The method may include presetting a synchronous action start instruction provided to a specific user (e.g., model 325). When the specific user receives tips from one or more viewer users (e.g., users 320) in a chat room of the exemplary disclosed communication application (e.g., chat application), the specific user may open the synchronization action start instruction. The exemplary disclosed tips may include virtual currency. The exemplary disclosed communication application may be configured to realize online chat (e.g., text, voice, and/or video chat) and communication interaction between users (e.g., users 320). One or more of the tip users in the chat room can choose to follow the specific user (e.g., model 325) to drive (e.g., actuate) the one or more sexual stimulation devices (e.g., viewer accessories 308) associated with the tip users and the sexual stimulation device (e.g., model accessory 315) associated with the specific user to synchronize the predefined act in real-time or near real-time.

In at least some exemplary embodiments, the exemplary disclosed system may include an accessory control module, comprising computer-executable code stored in non-volatile memory, a processor, a user device of a human viewer, a viewer accessory configured to communicate with the user device, the viewer accessory including a first motor or a first heater, a model device of a human model, and a model accessory configured to communicate with the model device, the model accessory including a second motor or a second heater. The accessory control module, the processor, the user device, the viewer accessory, the model device, and the model accessory may be configured to provide a chat communication application between the human viewer and the human model configured to provide chat (e.g., text, voice, and/or video chat) between the human viewer via the user device and the human model via the model device, control the viewer accessory including controlling the first motor or the first heater to drive a predefined act of the viewer accessory, and control the model accessory including controlling the second motor or the second heater to drive the predefined act of the model accessory. The predefined act may be driven synchronously in real-time to sexually stimulate synchronously both the human viewer and the human model using the viewer accessory and the model accessory during chat (e.g., text, voice, and/or video chat) between the human viewer and the human model. The predefined act may be at least one selected from the group of vibration, rotation, swinging, inhalation, temperature variation, expansion, suction, contraction, and combinations thereof. The predefined act may be a first predefined act. The accessory control module, the processor, the user device, the viewer accessory, the model device, and the model accessory may be further configured to control the viewer accessory including controlling the first motor or the first heater to drive a second predefined act of the viewer accessory that is different from the first predefined act, and control the model accessory including controlling the second motor or the second heater to drive the second predefined act of the model accessory. The human model may be a first human model and the model accessory may be a first model accessory. The first predefined act may be associated with the first model accessory. The second predefined act may be associated with a second model accessory of a second human model communicating through the chat communication application. The viewer accessory may be configured to communicate with the user device via Bluetooth or WiFi, and the model accessory may be configured to communicate with the model device via Bluetooth or WiFi. An application may be installed on the user device and the model device, the application being configured to send commands to the viewer accessory and the model accessory to drive the viewer accessory and the model accessory to perform the predefined act. Each of the user device and the model device may be selected from the group consisting of a mobile phone, a wearable device, a tablet, and a computer. The accessory control module, the processor, the user device, the viewer accessory, the model device, and the model accessory may be further configured to send an invitation from the model device for the predefined act to one or more user devices via the chat communication application. One or more human viewers may accept the invitation of the predefined act via the one or more user devices, the invitation being to synchronously drive in real-time one or more viewer accessories that may be one or more sexual stimulation devices associated with the one or more human viewers and the model accessory that may be a sexual stimulation device associated with the human model. The predefined act may be selected based on voting via the chat communication application by a plurality of human viewers viewing the chat communication application. The accessory control module, the processor, the user device, the viewer accessory, the model device, and the model accessory may be further configured to preset a synchronous action start instruction, and provide the synchronous action start instruction to the human model via the model device. When the human model opens the synchronization action start instruction in a chat room of the chat communication application, one or more human viewers in the chat room may selectively choose to follow the human model to synchronously drive in real-time one or more viewer accessories that may be one or more sexual stimulation devices associated with the one or more human viewers and the model accessory that may be a sexual stimulation device associated with the human model. The accessory control module, the processor, the user device, the viewer accessory, the model device, and the model accessory may be further configured to allow the human model to receive tips from one or more human viewers in the chat communication application, and drive one or more viewer accessories that may be sexual stimulation devices associated with the one or more human viewers who may be tip users who provided tips to the human model. Driving the one or more viewer accessories may include synchronously driving the one or more viewer accessories and the model accessory in real-time to perform the predefined act. The tips may include virtual currency.

In at least some exemplary embodiments, the exemplary disclosed system may include an accessory control module, comprising computer-executable code stored in non-volatile memory, a processor, one or more user devices of one or more human viewers, one or more viewer accessories configured to communicate with the one or more user devices, the one or more viewer accessories each including a first motor or a first heater, a model device of a human model, and a model accessory configured to communicate with the model device, the model accessory including a second motor or a second heater. The accessory control module, the processor, the one or more user devices, the one or more viewer accessories, the model device, and the model accessory may be configured to provide a chat communication application between the one or more human viewers and the human model configured to provide chat (e.g., text, voice, and/or video chat) between the one or more human viewers via the one or more user devices and the human model via the model device, control the one or more viewer accessories including controlling each of the first motor or the first heater to drive a predefined act of the one or more viewer accessories, and control the model accessory including controlling the second motor or the second heater to drive the predefined act of the model accessory. The predefined act may be driven synchronously in real-time to sexually stimulate synchronously the one or more human viewers and the human model using the one or more viewer accessories and the model accessory when the human model chats (e.g., via text, voice, and/or video chat) with the one or more human viewers. The accessory control module, the processor, the user device, the viewer accessory, the model device, and the model accessory may be further configured to send an invitation from the model device for the predefined act to one or more user devices via the chat communication application. The one or more human viewers may accept the invitation of the predefined act via the one or more user devices, the invitation being to synchronously drive in real-time one or more viewer accessories that may be one or more sexual stimulation devices associated with the one or more human viewers and the model accessory that may be a sexual stimulation device associated with the human model. The accessory control module, the processor, the user device, the viewer accessory, the model device, and the model accessory may be further configured to preset a synchronous action start instruction, and provide the synchronous action start instruction to the human model via the model device. When the human model opens the synchronization action start instruction in a chat room of the chat communication application, the one or more human viewers in the chat room may selectively choose to follow the human model to synchronously drive in real-time the one or more viewer accessories that may be one or more sexual stimulation devices associated with the one or more human viewers and the model accessory that may be a sexual stimulation device associated with the human model. The accessory control module, the processor, the user device, the viewer accessory, the model device, and the model accessory may be further configured to allow the human model to receive tips from the one or more human viewers in the chat communication application, and drive the one or more viewer accessories that may be sexual stimulation devices associated with the one or more human viewers who are tip users who may provide tips to the human model. Driving the one or more viewer accessories may include synchronously driving the one or more viewer accessories and the model accessory in real-time to perform the predefined act. The tips may include virtual currency. Each of the one or more user devices and the model device may be selected from the group consisting of a mobile phone, a wearable device, a tablet, and a computer.

In at least some exemplary embodiments, the exemplary disclosed system may include an accessory control module, comprising computer-executable code stored in non-volatile memory, a processor, one or more user devices of one or more human viewers, one or more viewer accessories configured to communicate with the one or more user devices, the one or more viewer accessories each including a first motor or a first heater, a model device of a human model, and a model accessory configured to communicate with the model device, the model accessory including a second motor or a second heater. The computer-executable code, when operating on the processor, maybe cause the system to provide an adult entertainment application (e.g., a chat communication application, the chat communication application is configured to provide text, chat voice, and/or video chat) between one or more human viewers and a human model configured to provide an invitation between the one or more human viewers via one or more user devices and the human model via a model device, wherein the at least one viewer accessory is configured to communicate with the one or more user devices, and the model accessory is configured to communicate with the model device. The computer-executable code, when operating on the processor, maybe cause the system to establish an association between the model accessory via the model device and the viewer accessory via the user device that has accepted the invitation from the model device via the application, wherein the invitation is configured to be for a synchronous predefined act of the viewer accessory and the model accessory, not to be for controlling the viewer accessory and the model accessory to perform a predefined act. The computer-executable code, when operating on the processor, maybe cause the system to generate commands for controlling the viewer accessory, which has accepted the invitation, and the model accessory via the application when adult entertainment behavior of one or both of the one or more human viewers or the model satisfying a predetermined adult entertainment condition. The computer-executable code, when operating on the processor, maybe cause the system to send the commands directly or indirectly to the model device and the one or more user devices synchronously in real-time or near real-time via the adult entertainment application. The computer-executable code, when operating on the processor, maybe cause the system to control the model accessory to drive a predefined act of the model accessory based on the commands; and control the at least one viewer accessory to drive a predefined act of the at least one viewer accessory based on the commands. The predefined act of the at least one viewer accessory and the predefined act of the model accessory are configured to be driven synchronously in real-time e or near real-time due to the established association to sexually stimulate synchronously both the one or more human viewers and the human model using the at least one viewer accessory and the model accessory. The predefined act of the at least one viewer accessory and the predefined act of the model accessory are different and synchronously performed based on a feature of the adult entertainment behavior of one or both of the one or more human viewers or the model. For example, the one or more user devices of one or more human viewers can be mobile phones, tablets or other devices. Viewers log in to the live streaming platform through these devices to watch the live content of the models and participate in the interaction. The one or more viewer accessories can be adult toys with specific functions (such as vibration function, thrusting function, etc.). Each viewer's toy contains a first motor or a first heater inside. For example, some toys are massage stick-style toys that can generate stimulation through vibration (the vibration is driven by the motor), and they can communicate with the viewer's user devices through Bluetooth or specific wireless communication protocols. The model device of a human model can be a computer, a mobile phone or other devices, which are used for live streaming display, receiving and sending various interactive information, etc. The model accessory can also be an adult toy, for example, a product with a second motor or a second heater, like a female adult toy with a vibration function (the vibration is driven by the motor), and it can communicate with the model's device. The adult entertainment application can be a software platform running based on the system, which has the functions of providing multiple communication methods such as text, chat voice and video chat. Viewers can praise the models' figures through text bullet screens in the live streaming room, chat with the models about some ambiguous topics through voice, or apply for video chat to conduct more intuitive interactive communication. When viewers and models enter this live streaming interaction platform and start to interact, the system relies on the computer-executable code in the accessory control module running on the processor. Firstly, it will establish an association between the model accessory through the model device and at least one viewer accessory through the viewer's user device. For example, viewer A logs in to the platform using a mobile phone, and the corresponding adult toy is successfully paired with the mobile phone via Bluetooth. The model uses a computer for live streaming, and the wearable adult toy on the model is also connected to the computer. The system links these two accessories together for subsequent unified and coordinated control. As the interaction progresses, if the pre-set adult entertainment conditions are met. For example, within a certain period of time (which is one of the preset conditions), the number of bullet screens with specific keywords such as ambiguous or praising sent by viewers reaches the set threshold, or viewers and models perform specific intimate interactive actions during the video chat process (these all belong to the situations where the adult entertainment behavior meets the preset conditions). At this time, relying on the running computer-executable code, the system will generate commands for controlling the viewer accessories and the model accessories through the adult entertainment application. Then, these commands will be sent directly or indirectly through the adult entertainment application to the model's device and the viewer's one or more user devices in near real-time and synchronously. For example, the commands are transmitted through the network and reach the model's computer and the viewer's mobile phone almost at the same time to ensure that both sides can respond in a timely manner. Based on the received commands, the system will control the model accessory to drive its predefined act. For example, the female sex toy of the model starts to vibrate according to the intensity and frequency set by the command. At the same time, it will also control the viewer's accessory to drive its corresponding predefined act. For example, the male sex toy of the viewer also starts to massage the viewer's penis, and the parameters such as the massage rhythm are synchronized with the accessories on the model's side. This synchronous predefined act (the two acts can be different, such as different vibration frequencies and amplitudes, but they are carried out synchronously as a whole. Alternatively, the two acts can be the same), relying on the previously established association, can simultaneously generate sexual stimulation for both the viewers and the models, enhance the sensory experience of both sides in the interaction process, and achieve the special interactive effect in the adult entertainment scene. And the synchronous execution of these acts is determined based on the adult entertainment behavior characteristics of one or both of the viewers or the models.

In some embodiments, the exemplary disclosed system may determine whether or not an invitation has been sent by one of the plurality of models 325 and users 320 to other of the plurality of models 325 and users 320. For example, the exemplary disclosed system may determine that model 325 sent an invitation to one or more users 320 (e.g., viewers). The invitation may be provided via the exemplary disclosed interactive or messaging application (e.g., chat room) for example as illustrated in FIG. 3. The invitation may be provided via private message (e.g., private text message), a prompt to one or more users 320 based on input provided to the exemplary disclosed module via model 325, video interaction, and/or any other suitable data transfer using the exemplary disclosed components and modules of system 300. The exemplary disclosed invitation may be for a synchronous predefined act. The synchronous predefined act of viewer accessories 308 and model accessories 315 may include vibration, a suction operation, rotation, swinging, contracting, expanding, performing an inhalation action, heating, cooling, undergoing temperature variation, and/or any other suitable action or function for example as described herein. The recipients of the invitation may be selected by any suitable technique such as, for example, random selection of users 320 and/or models 325 by the exemplary disclosed system, manual or intentional selection (e.g., input data) by a given model 325 (e.g., or given user 320), voting (e.g., via input data) by the plurality of users 320 and/or models 325, a predetermined algorithm of the exemplary disclosed modules, exemplary disclosed machine learning operations, and/or any other suitable criteria.

In at least some exemplary embodiments, the system can provide invitations in the following ways: The system can provide invitations in text form (for example, by introducing on the interface with text like "The synchronous vibration function of the model's toy and the viewer's toy has been activated", or by using text to prompt the viewers to activate this function, etc.). The system can provide invitations in picture form (for example, an invitation QR code, or by using pictures to introduce "The synchronous vibration function of the model's toy and the viewer's toy"). The system can provide invitations in the form of interface elements (for example, presenting a control on the viewer's interface that is used to activate the function of making the viewer's toy vibrate following the model's toy. After the viewer operates this control, this function can be activated). The system can provide invitations in the form of links (for example, linking to relevant interactive introduction pages or video previews, or an invitation link URL, etc.). The system can provide invitations in video form (for example, the model makes an inviting gesture in the live video, or presents invitation information in the video picture, such as popping up invitation captions or invitation links in the form of animation special effects around the model, etc.) to convey or provide invitations.

In at least some exemplary embodiments, the invitations provided by the system can also be encrypted to ensure the security and privacy of the invitation information, so that only specific recipients can decrypt and view them. This is applicable to high-privacy-level interactive invitations, such as high-end interactive activities for exclusive members. Furthermore, the system can also provide invitations through private message group sending based on viewer grouping. For example, the system groups the viewers according to multi-dimensional data such as interest tags, consumption levels, and interaction frequencies. The system sends customized private message invitations to specific groups of viewers to improve the accuracy and effectiveness of the invitations.

In some embodiments, adult entertainment behavior includes the act of viewers tipping the models via their respective user devices (such as mobile phones, tablets, etc.). Tipping here becomes a specific behavioral manifestation in adult entertainment interaction and is a way for viewers to express their appreciation, support for the models or their expectation to obtain more interactive experiences.

In some embodiments, within the preset adult entertainment conditions, it involves dividing the viewers' tipping amounts into one or more predetermined ranges, and each tipping amount range corresponds to one or more predefined acts. For example, three different tipping amount intervals are set, corresponding respectively to different performance actions of the models, the interactive permissions that viewers can obtain, or different action modes of both parties' toys (including action types, action durations, action intensities, action speeds, action frequencies, etc.). Through such settings, different interactive contents between viewers and models can be triggered according to the tipping situations.

In at least some exemplary embodiments, The predefined acts of at least one viewer accessory (such as male adult toys with functions like vibration, telescoping, etc.) and the model accessory (such as female adult toys with functions like vibration, heating, etc.) are determined and synchronously executed based on the viewers' tipping amounts. That is to say, the amount of the tip becomes a key factor driving both parties' accessories to perform corresponding actions, so as to create an interactive atmosphere and experience that match the tipping situations.

In some embodiments, the action parameter values of the predefined act of the at least one viewer accessory and the action parameter values of the predefined act of the model accessory have correspondence in ways such as being equal, proportional, or in a time-sequence manner. For example, in some cases, the action parameter values of the viewer accessory and the model accessory are completely the same. The system will, according to the set rules, set a certain action parameter of both the viewer's toy and the model's toy to the same value when certain conditions are met (such as specific tipping amounts, interactive behaviors, etc.). For instance, if the action parameter of the viewer's toy is the linear reciprocating motion frequency and that of the model's toy is the vibration frequency, when the viewer's tip reaches a certain amount, the system will send instructions to make the linear reciprocating motion frequency of the viewer's toy and the vibration frequency of the model's toy both be 3 times per second. Such equal parameter settings can enable both parties to achieve a synchronous effect in this action and enhance the consistency of the interactive experience.

For example, there is a certain proportional relationship between the action parameter values of the viewer accessory and the model accessory. The system has preset proportional algorithm trigger conditions to adjust the action parameters of both toys. For example, the vibration amplitude of the model's toy is always twice that of the viewer's toy (proportional correspondence). For instance, when the trigger condition is met and taking the vibration amplitude as the action parameter, the system will set the vibration amplitude of the model's toy to 3 millimeters, while that of the viewer's toy will be set to 6 millimeters according to the 2:1 ratio. Such a proportional relationship can create different intensities of interactive feelings according to specific design intentions, providing both parties with different yet interrelated experiences.

In at least some exemplary embodiments, the action parameter values of the viewer accessory and the model accessory are arranged in a time sequence. The system will, according to the timeline and the set interactive rules, trigger different action parameters of the viewer's and the model's toys in sequence. Among them, the time sequence of each sexual stimulation action of the viewer's toy is the same as or has a very short time interval (time sequence correspondence) with that of the model's toy, for example, with a difference of 0.1 second. For example, if the instruction received by the viewer's device is 0.1 second faster than that received by the model's device, then in the time sequence, the execution time of each sexual stimulation action of the viewer's toy is 0.1 second slower than that of the massage action of the model's toy, so that the execution of sexual stimulation actions of the viewer's toy and the model's toy can be more synchronous in time without delay, improving the interactive experience between the viewer and the model. For another example, the system will set the vibration frequency of the viewer's toy to 2 times per second and maintain it for 10 seconds at time point T1, and then set the vibration frequency of the model's toy to 3 times per second and maintain it for 15 seconds at time point T2 (T2>T1). Through such an arrangement in the time sequence, an orderly interactive process can be constructed, giving the interaction between both parties a sequence in time and increasing the sense of rhythm in the interaction.

In some embodiments, the action parameter values of the predefined act of the at least one viewer accessory and the action parameter values of the predefined act of the model accessory have a unary or multivariate correspondence with the value of the tip in one or both of time dimension and quantity dimension. In the time dimension, the time dimension involves time factors during the live streaming process. This may include the time point when the tip occurs, the time interval between tips, or the tipping situation within a specific time period, etc. The system will record these time-related data and determine the toy action parameters according to the preset rules. For example, the system may have a timer to track the passage of time during the live streaming and record the time stamp of each tip at the same time, so as to judge whether the time-based tipping conditions are met.

In at least some exemplary embodiments, in the quantity dimension, the quantity dimension mainly focuses on numerical factors related to the tipping amount. This includes the single tipping amount, the cumulative tipping amount, the number of tips, etc. The system will conduct statistics and analysis on these data and has corresponding algorithms to determine the toy action parameters according to these values. For example, the system has a counter to record the tipping amount and the number of tips, and triggers different toy actions by comparing these data with the preset thresholds.

The system directly establishes a connection between a single factor of the tip (either a factor in the time dimension or a factor in the quantity dimension) and the toy action parameters. For example, if only the single tipping amount in the quantity dimension is considered, the system will set a fixed rule. For instance, if the single tipping amount reaches 30 yuan, the vibration frequencies of both the viewer's and the model's toys will be set to 3 times per second. This correspondence relationship only depends on one variable (the single tipping amount) to determine the action parameter, which is a direct one-to-one relationship.

The multivariate correspondence relationship involves comprehensively considering multiple factors (which can be multiple variables in both the time dimension and the quantity dimension) to determine the toy action parameters. For example, the system may comprehensively consider the cumulative tipping amount (quantity dimension) and the number of tips (quantity dimension) within the first 5 minutes after the toy synchronization function is enabled (time dimension). If the cumulative tipping amount reaches 200 tokens within the first 5 minutes, then the system will adjust multiple action parameters of both the viewer's and the model's toys, such as vibration frequencies, vibration amplitudes, luminous colors, and brightnesses, etc.

For another example, suppose there are multiple viewers and one model in the live streaming room. The system sets that if within 5 minutes after the toy synchronization function is enabled (time dimension), the cumulative tipping amount of the viewers reaches 300 tokens (quantity dimension), and the total number of tips is no less than 5 times (quantity dimension), then the vibration frequencies of the viewers' toys will be set proportionally according to the amount of the tip (for example, the vibration frequency will increase by 1 time per second for every additional 50 yuan of the tip), the vibration amplitudes will be set according to the number of tips (for example, the vibration amplitude will increase by 1 millimeter for every additional 1 time of the tip); the vibration frequency of the model's toy will be 80% of that of the viewers' toys, and the luminous brightness will be set according to the cumulative tipping amount of the viewers (for example, the luminous brightness will increase by 30 lumens for every additional 100 yuan of the cumulative tipping amount).

In at least some exemplary embodiments, in addition to the functions described previously, the system is also capable of providing an indication to the model device and the one or more user devices of the viewers (that is, the devices used by the model and the viewers respectively, such as the computer used by the model and the mobile phones used by the viewers). Among them, the indication sent by the system to the model device through the corresponding application (for example, the chat application mentioned above) is configured to inform the human model, through the model device, of the execution status of the model accessory in performing the predefined act. For example, when the model accessory (such as the adult toy with functions like vibration and lighting used by the model) starts to vibrate or light up according to the system instructions, this indication can tell the model whether the function of synchronizing vibration with the viewer's toy is enabled for the adult toy, whether it is working properly, and even specific execution details such as what the vibration frequency of the model's adult toy is and what color the light is, so that the model can clearly understand the current action state of her accessory. Meanwhile, the system can send an indication to the one or more viewer devices through the corresponding application (for example, the chat application mentioned above), which is used to show, through these viewer devices, the execution status of at least one viewer accessory in performing the predefined act to the one or more human viewers. For example, this indication can tell the human viewers whether the function of synchronizing vibration with the model's toy is enabled for the adult toy, whether it is working properly, and even details about the action status such as what the vibration intensity of the viewer's adult toy is and whether it is performing telescoping actions according to the rules, enabling the viewers to also know the actual operating state of their adult toys. For example, the indication can be displayed on the model device or the viewer device in various ways, such as through pop-up windows, notification bars, specific display areas on the interface, voice prompts, and mobile phone vibration prompts.

In at least some exemplary embodiments, adult entertainment behavior includes the important part of communication behavior between viewers and models. This means that it's not just viewers simply watching the models' performances. There can also be various forms of information exchange, emotion transmission and other interactive ways between both the viewers and the models. These communication behaviors can be realized through different forms such as text (such as sending messages, bullet screens, etc.), expressions (sending emojis), gestures (making specific gestures), etc. They form the basic premise for a series of subsequent interactive rules to take effect. For example, viewers can send text to praise the models through the chat box in the live streaming room, or models can respond to viewers' interactive requests by making specific gestures. All of these fall into the category of the defined communication behaviors, and the system can identify and record the occurrence of these interactive behaviors. The system has preset adult entertainment conditions. For example, the system defines some characteristics of communication behaviors as target features in advance and makes these target features correspond to one or more predefined acts. That is to say, the system determines some specific manifestations or characteristics of communication behaviors as "target features" in advance. For instance, the frequent appearance of specific keywords, the number of a certain type of emojis sent reaching a certain threshold, the number of times specific gestures are repeated, etc. Once these target features are detected in the actual interaction between viewers and models, the predefined acts associated with them will be triggered. It's like there is a preset "rule engine" in the system, which decides the next action to be taken according to whether the communication behaviors meet these preset target features, thus building a logical chain that drives subsequent behaviors based on communication and interaction situations. For at least one viewer accessory (such as the adult toy in the viewer's hand) and the model's accessory (such as the relevant adult toy used by the model), their respective predefined acts are to be synchronously executed based on the target features of the communication behaviors. The system will monitor the occurrence of target features in communication behaviors in real time. When the corresponding conditions are met, it will coordinate both parties' accessories to simultaneously carry out corresponding actions according to the preset action modes. For example, if a large number of specific keywords praising the model appear in the communication behaviors (this is a target feature), after the system determines that the conditions are met, it will simultaneously send instructions to the viewers' toys and the model's toys to make them start vibrating, lighting up, etc. (predefined acts), and the actions on both sides will be synchronously coordinated in parameters such as time and intensity according to the system settings, so as to create a synergistic stimulation effect generated based on communication and interaction and enhance the experience and interest of the entire adult entertainment interaction.

For example, the specific forms covered by the communication behaviors between human viewers and human models involve at least one of the following situations. From the viewers' perspective, they can like the models via user devices, send target keywords, send target emojis, make target gestures, or make target expressions. From the models' perspective, they can send target keywords to the viewers, send target emojis to the viewers, make target gestures to the viewers, or make target expressions to the viewers.

In at least some exemplary embodiments, the exemplary disclosed method may include providing one or more user devices of one or more human viewers, providing one or more viewer accessories configured to communicate with the one or more user devices, the one or more viewer accessories each including a first motor or a first heater, providing a model device of a human model, providing a model accessory configured to communicate with the model device, the model accessory including a second motor or a second heater, providing a chat communication application between the one or more human viewers and the human model configured to provide chat (e.g., text, voice, and/or video chat) between the one or more human viewers via the one or more user devices and the human model via the model device. The exemplary disclosed method may also include controlling the first motor or the first heater to drive a predefined act of the one or more viewer accessories, controlling the second motor or the second heater to drive the predefined act of the model accessory, presetting a synchronous action start instruction, and providing the synchronous action start instruction to the human model via the model device when the human model receives tips from the one or more human viewers via the one or more user devices and the model device. When the human model opens the synchronization action start instruction in a chat room of the chat communication application, the one or more human viewers in the chat room may selectively choose to follow the human model to synchronously drive the predefined act in real-time to sexually stimulate synchronously the one or more human viewers and the human model using the one or more viewer accessories associated with the one or more human viewers and the model accessory associated with the human model. The tips may include virtual currency. The exemplary disclosed method may also include providing chat communication between the one or more human viewers and the human model when the human model opens the synchronization action start instruction via the model device. The one or more viewer accessories may be one or more sexual stimulation devices and the model accessory may be a sexual stimulation device.

The exemplary disclosed system, apparatus, and method may provide an efficient and effective technique for controlling devices associated with a model (e.g., a human model such as a specific user) and devices associated with users (e.g., human viewers) who are viewing the model. For example, the exemplary disclosed system, apparatus, and method may synchronously control devices associated with a model (e.g., a human model such as a specific user) and devices associated with users (e.g., human viewers) who are viewing the model. Also for example, exemplary disclosed system, apparatus, and method may provide an efficient and effective technique for synchronously controlling devices associated with a model (e.g., a specific user) and devices associated with users (e.g., viewers) who are viewing the model based on tips provided by the viewers to the model.

In at least some exemplary embodiments, the exemplary disclosed system, apparatus, and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Figure 5:
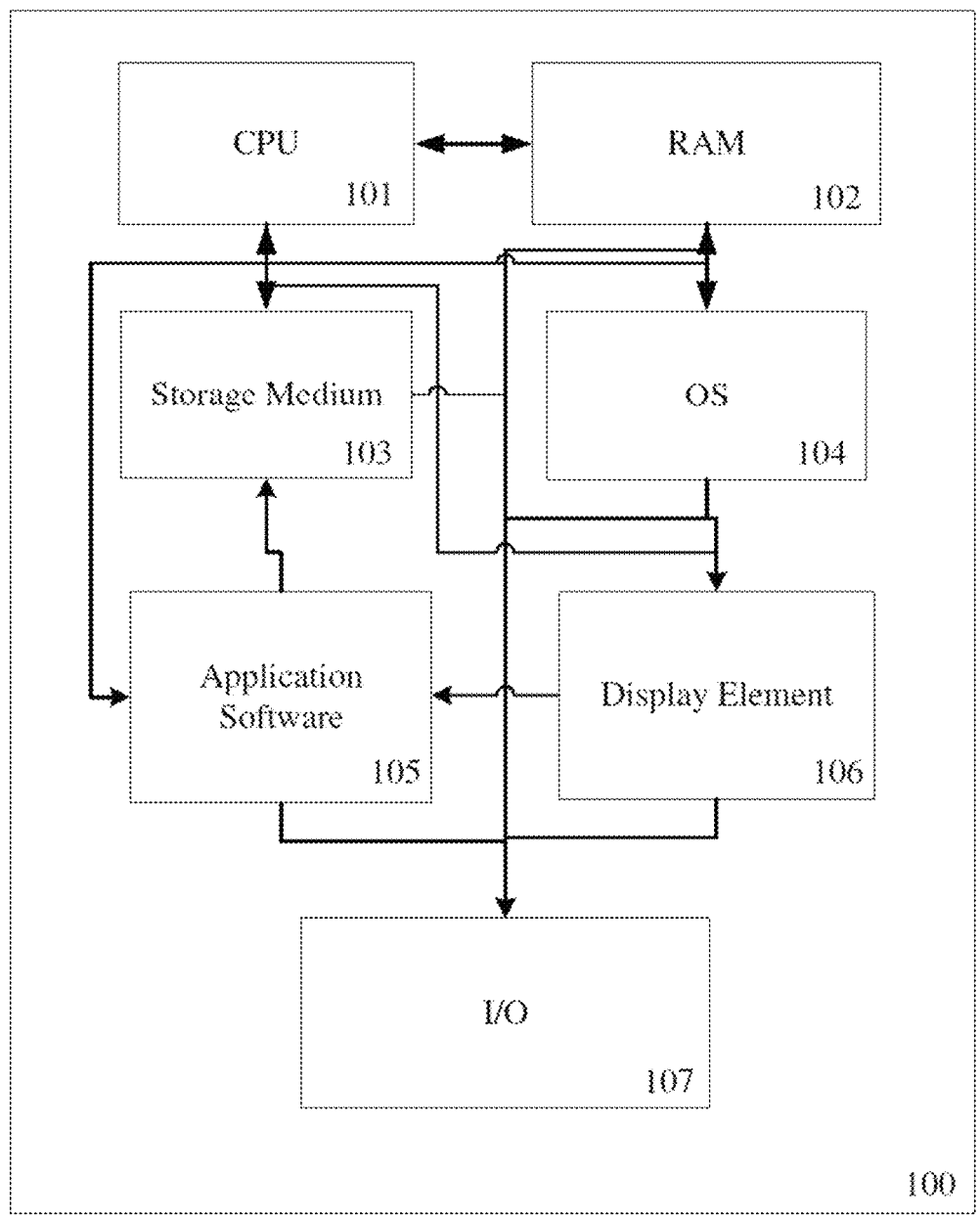
FIG. 5 is a schematic illustration of an exemplary computing device, in accordance with at least some exemplary embodiments of the present disclosure.

An illustrative representation of a computing device appropriate for use with embodiments of the system of the present disclosure is shown in FIG. 5. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 6, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 6:
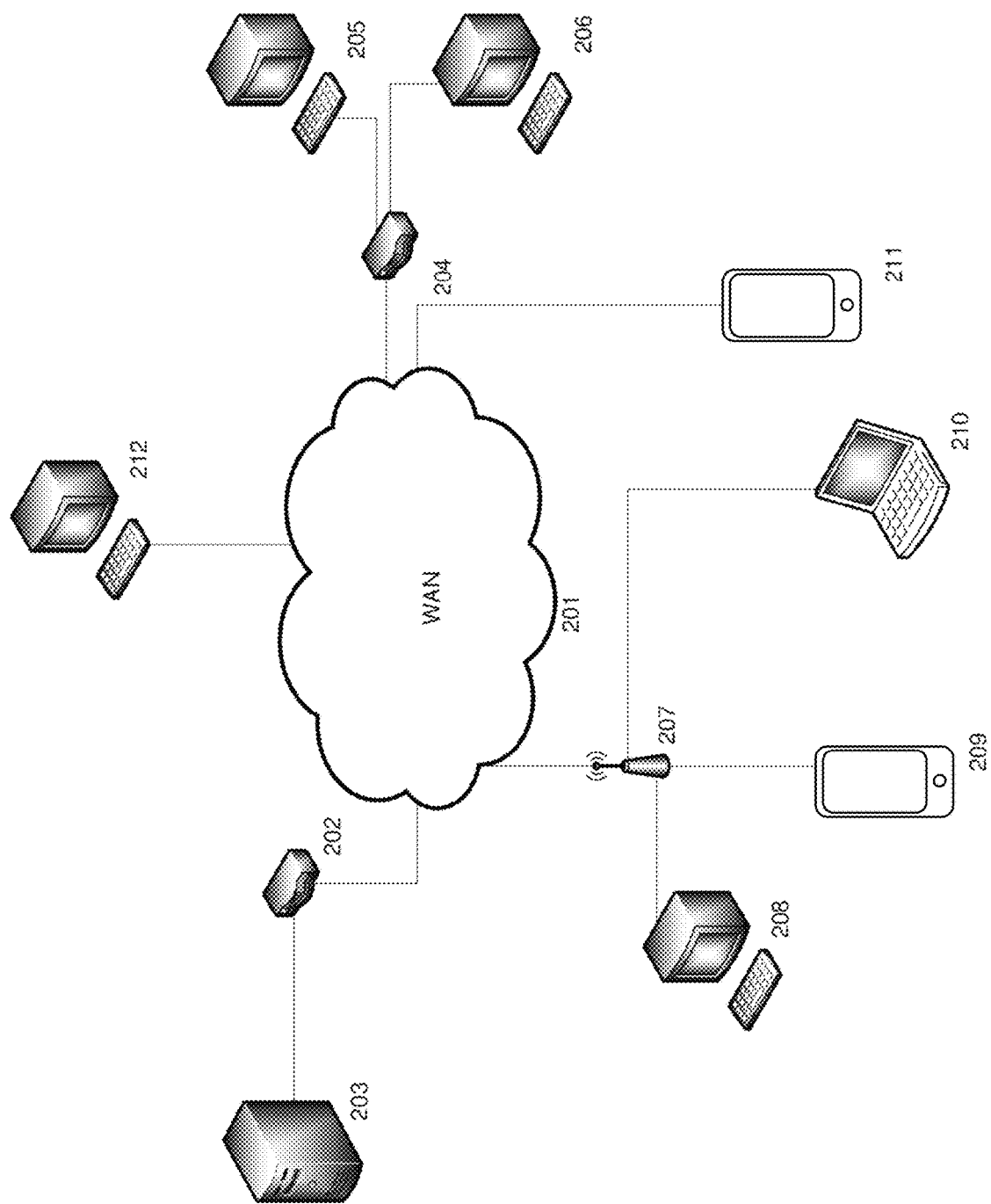
FIG. 6 is a schematic illustration of an exemplary network, in accordance with at least some exemplary embodiments of the present disclosure.

Referring to FIG. 6, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 6, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A system, comprising:
   an accessory control module, comprising computer-executable code stored in non-volatile memory; and
   a processor;
   wherein the computer-executable code, when operating on the processor, causes the system to:
   provide an application between a human viewer and a human model configured to provide an invitation between the human viewer via a user device and the human model via a model device, wherein a viewer accessory is configured to communicate with the user device, and a model accessory is configured to communicate with the model device;
   establish an association between the model accessory via the model device and the viewer accessory via the user device that has accepted the invitation from the model device via the application;
   wherein the invitation is configured to be for a synchronous predefined act of the viewer accessory and the model accessory, not to be for controlling the viewer accessory and the model accessory to perform a predefined act;
   generate commands for controlling the viewer accessory, which has accepted the invitation, and the model accessory via the application when adult entertainment behavior of one or more human viewers satisfies a predetermined adult entertainment condition;
   send the commands directly or indirectly to the model device and the user device synchronously in real-time or near real-time;
   control the viewer accessory to drive a predefined act of the viewer accessory based on the commands; and
   control the model accessory to drive a predefined act of the model accessory based on the commands;
   wherein the predefined act of the viewer accessory and the predefined act of the model accessory are configured to be driven synchronously in real-time or near real-time due to the established association to sexually stimulate synchronously both the human viewer and the human model using the viewer accessory and the model accessory.

2. The system of claim 1, wherein:
   the adult entertainment behavior includes the human viewer giving a tip to the human model via the user device;
   the predetermined adult entertainment condition includes an amount of the tip of falling into one or more predetermined tip ranges that corresponds to one or more predefined acts;
   the predefined act of the viewer accessory and the predefined act of the model accessory are synchronously performed based on the amount of the tip;
   an action parameter value of the predefined act of the at accessory and an action parameter value of the predefined act of the model accessory have a unary or multivariate correspondence with the amount of the tip in one or both of a time dimension and a quantity dimension; and
   the action parameter value of the predefined act of the viewer accessory corresponds either equally, proportionally or in a time-sequence manner to the action parameter value of the predefined act of the model accessory.

3. The system of claim 1, wherein the accessory control module, the processor, the user device, the viewer accessory, the model device, and the model accessory are further configured to:
   provide an indication to one or both of the model device and the user device that have received the commands via the application;
   wherein the indication received by the model device is configured to indicate an execution status of the model accessory of the predefined act of the model accessory to the human model through the model device, and the indication received by the user device is configured to indicate an execution status of the viewer accessory of the predefined act of the viewer accessory to the human viewer through the user device.

4. The system of claim 1, wherein:
the adult entertainment behavior includes communication behavior between the human viewer and the human model;
the predetermined adult entertainment condition includes having a target feature of the communication behavior that corresponds to one or more predefined acts; and
the predefined act of the accessory and the predefined act of the model accessory are synchronously performed based on the target feature of the communication behavior.

5. The system of claim 4, wherein:
the communication behavior between the human viewer and the human model includes the human viewer liking the model via the user device, the human viewer sending a target keyword to the model via the user device, the human viewer sending a target emoji to the model via the user device, human viewer making a target gesture towards the model, the human viewer making a target expression towards the model, the model sending a target keyword to the human viewer via the model device, the model sending a target emoji to the human viewer via the model device, the model making a target gesture towards the human viewer, and the model making a target expression towards the human viewer.

6. The system of claim 1, wherein the predefined act of the viewer accessory that is used to sexually stimulate the human viewer and the predefined act of the model accessory that is used to sexually stimulate the human model are each at least one selected from the group of vibration, rotation, swinging, inhalation, temperature variation, expansion, suction, contraction, and combinations thereof.

7. The system of claim 1, wherein:
the viewer accessory is configured to communicate with the user device via wireless communication, and the model accessory is configured to communicate with the model device via wireless communication; and
the application is installed on the user device and the model device, the application being configured to send commands to the viewer accessory and the model accessory to drive the viewer accessory to perform the predefined act of the viewer accessory and the model accessory to perform the predefined act of the model accessory.

8. The system of claim 1, wherein the accessory control module, the processor, the user device, the viewer accessory, the model device, and the model accessory are further configured to:
send an invitation from the model device for the predefined act of the viewer accessory to the user device via the application;
wherein the user device is configured to allow the human viewer to accept the invitation of the predefined act of the viewer accessory via the user device, the invitation being to synchronously drive in real-time the viewer accessory, which is a sexual stimulation device associated with the human viewer, and the model accessory, which is a sexual stimulation device associated with the human model.

9. The system of claim 1, wherein each of the predefined act of the viewer accessory and the predefined act of the model accessory is selected based on voting via the application by a plurality of human viewers viewing the application.

10. The system of claim 1, wherein the accessory control module, the processor, the user device, the viewer accessory, the model device, and the model accessory are further configured to:
preset a synchronous action start instruction; and
provide the synchronous action start instruction to the human model via the model device;
wherein the model device is configured to allow the human model to open the synchronization action start instruction in a chat room of the application, and when the synchronization action start instruction is opened, the human viewer in the chat room can selectively choose to follow the human model to synchronously drive in real-time the viewer accessory, which is a sexual stimulation device associated with the human viewer, and the model accessory, which is a sexual stimulation device associated with the human model.

11. The system of claim 1, wherein the accessory control module, the processor, the user device, the viewer accessory, the model device, and the model accessory are further configured to:
allow the human model to receive tips from the human viewer in the application; and
drive the viewer accessory, which is a sexual stimulation devices device associated with the human user who provided tips to the human model;
wherein driving the viewer accessory includes synchronously driving the viewer accessory and the model accessory in real-time to perform the predefined act; and
wherein the tips include virtual currency.

12. A method, comprising:
providing an application between a first user and a second user configured to provide an invitation between the first user via a first user device and the second user via a second user device, wherein a first accessory is configured to communicate with the first user device, and a second accessory is configured to communicate with the second user device;
establishing an association between the second accessory via the second user device and the first accessory via the first user device that has accepted the invitation from the second user device via the application;
wherein the invitation is configured to be for a synchronous predefined act of the first accessory and the second accessory, not to be for controlling the first accessory and the second accessory to perform a predefined act;
generating commands for controlling the first accessory, which has accepted the invitation, and the second accessory via the application when adult entertainment behavior of the first user satisfies a predetermined adult entertainment condition;
sending the commands directly or indirectly to the second user device and the first user device synchronously in real-time or near real- time;
controlling the first accessory to drive a predefined act of the first accessory based on the commands; and
controlling the second accessory to drive a predefined act of the second accessory based on the commands;
wherein the predefined act of the first accessory and the predefined act of the second accessory are configured to be driven synchronously in real-time or near real-time due to the established association to sexually stimulate synchronously both the first user and the human model using the viewer accessory and the model accessory.

13. The method of claim 12, wherein:
the adult entertainment behavior includes the first user giving a tip to the second user via the first user device;
the predetermined adult entertainment condition includes an amount of the tip falling into one or more predetermined tip ranges that corresponds to one or more predefined acts;
the predefined act of the first accessory and the predefined act of the second accessory are synchronously performed based on the amount of the tip;
an action parameter value of the predefined act of the first accessory and an action parameter value of the predefined act of the second accessory have a unary or multivariate correspondence with the amount of the tip in one or both of time dimension and quantity dimension; and
the action parameter value of the predefined act of the first accessory corresponds either equally, proportionally or in a time-sequence manner to the action parameter value of the predefined act of the second accessory.

14. The method of claim 12, further comprising:
providing an indication to one or both of the first user device and the second user device that have received the commands through the application, the indication received by the second user device is configured to indicate an execution status of the second accessory of the predefined act of the second accessory to the second user through the second user device, and the indication received by the first user device is configured to indicate an execution status of the at least one viewer accessory of the predefined act of the first accessory to the first user through the first user device.

15. The method of claim 12, wherein:
the adult entertainment behavior includes communication behavior between the first user and the second user;
the predetermined adult entertainment condition includes having a target feature of the communication behavior that corresponds to one or more predefined acts; and
the predefined act of the first accessory and the predefined act of the second accessory are synchronously performed based on the target feature of the communication behavior.

16. The method of claim 15, wherein:
the communication behavior between the first user and the second user includes the first user liking the second user via the first user device, the first user sending a target keyword to the second user via the first user device, the first user sending a target emoji to the second user via the first user device, the second user sending a target keyword to the first user via the second user device, and the second user sending target emoji to the first user via the second user device.

17. The method of claim 12, wherein the predefined act of the first accessory that is used to sexually stimulate the first user and the predefined act of the second accessory that is used to sexually stimulate the second user are each at least one selected from the group of vibration, rotation, swinging, inhalation, temperature variation, expansion, suction, contraction, and combinations thereof.

18. The method of claim 12, further comprising:
sending an invitation from the second user device for the predefined act of the first accessory to the first user device via the application;
wherein the first user device is configured to allow the first user to accept the invitation of the predefined act of first accessory via the first user device, the invitation being to synchronously drive in real-time the first accessory, which is a sexual stimulation device associated with the first user, and the second accessory, which is a sexual stimulation device associated with the second user.

19. The method of claim 12, wherein:
the first user is human viewer and the second user is human model.

20. A non-transitory computer-readable storage medium having a program stored thereon, the program being executable to control a hardware processor to execute processes comprising:
providing an application between a human viewer and a human model configured to provide an invitation between the human viewer via a user device and the human model via a model device, wherein a viewer accessory is configured to communicate with the user device, and a model accessory is configured to communicate with the model device;
establishing an association between the model accessory via the model device and the viewer accessory via the user device that has accepted the invitation from the model device via the application;
wherein the invitation is configured to be for a synchronous predefined act of the viewer accessory and the model accessory, not to be for controlling the viewer accessory and the model accessory to perform a predefined act;
generating commands for controlling the viewer accessory, which has accepted the invitation, and the model accessory via the application when adult entertainment behavior of the model satisfies a predetermined adult entertainment condition;
sending the commands directly or indirectly to the model device and the user device synchronously in real-time or near real-time;
controlling the viewer accessory to drive a predefined act of the viewer accessory based on the commands; and
controlling the model accessory to drive a predefined act of the model accessory based on the commands;
wherein the predefined act of the viewer accessory and the predefined act of the model accessory are configured to be driven synchronously in real-time or near real-time due to the established association to sexually stimulate synchronously both the human viewer and the human model using the viewer accessory and the model accessory.

* * * * *